INVENTOR:
John B. Gray

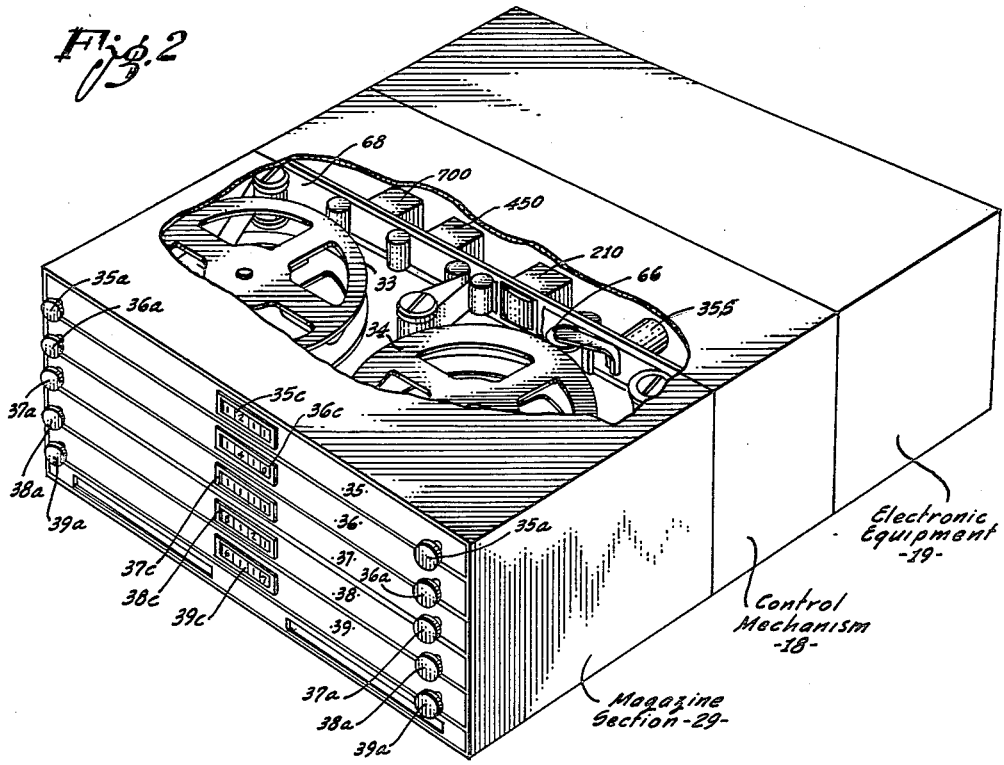
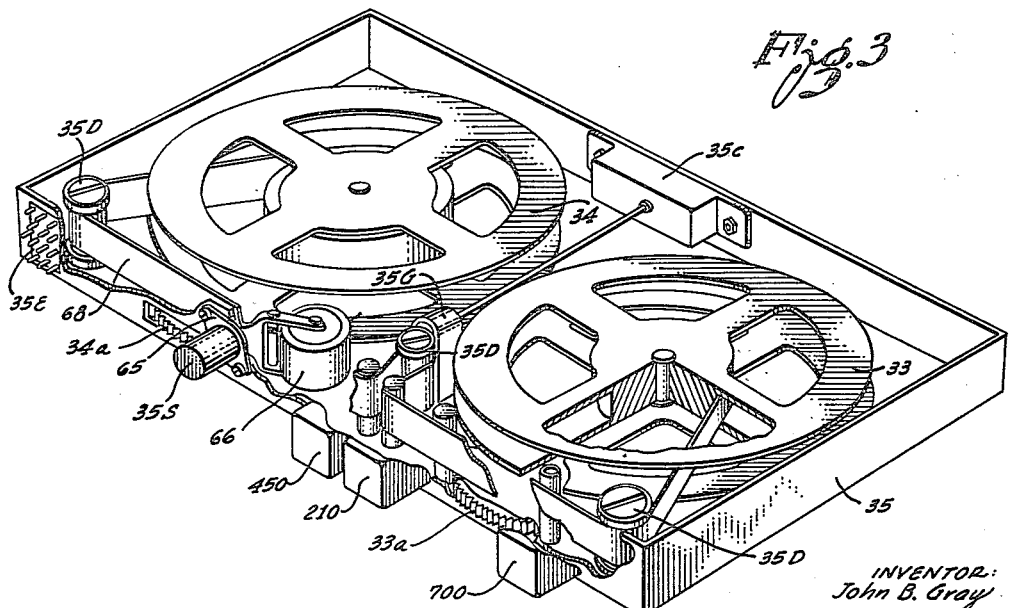

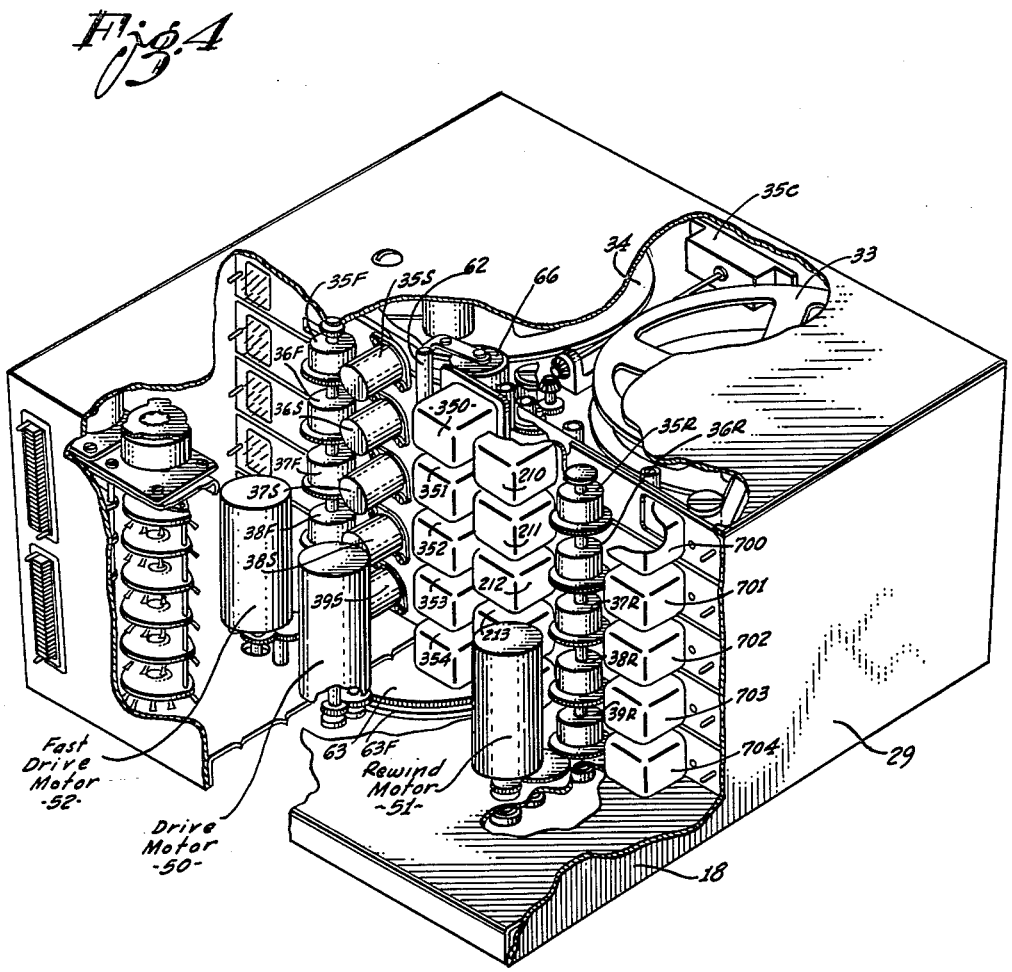

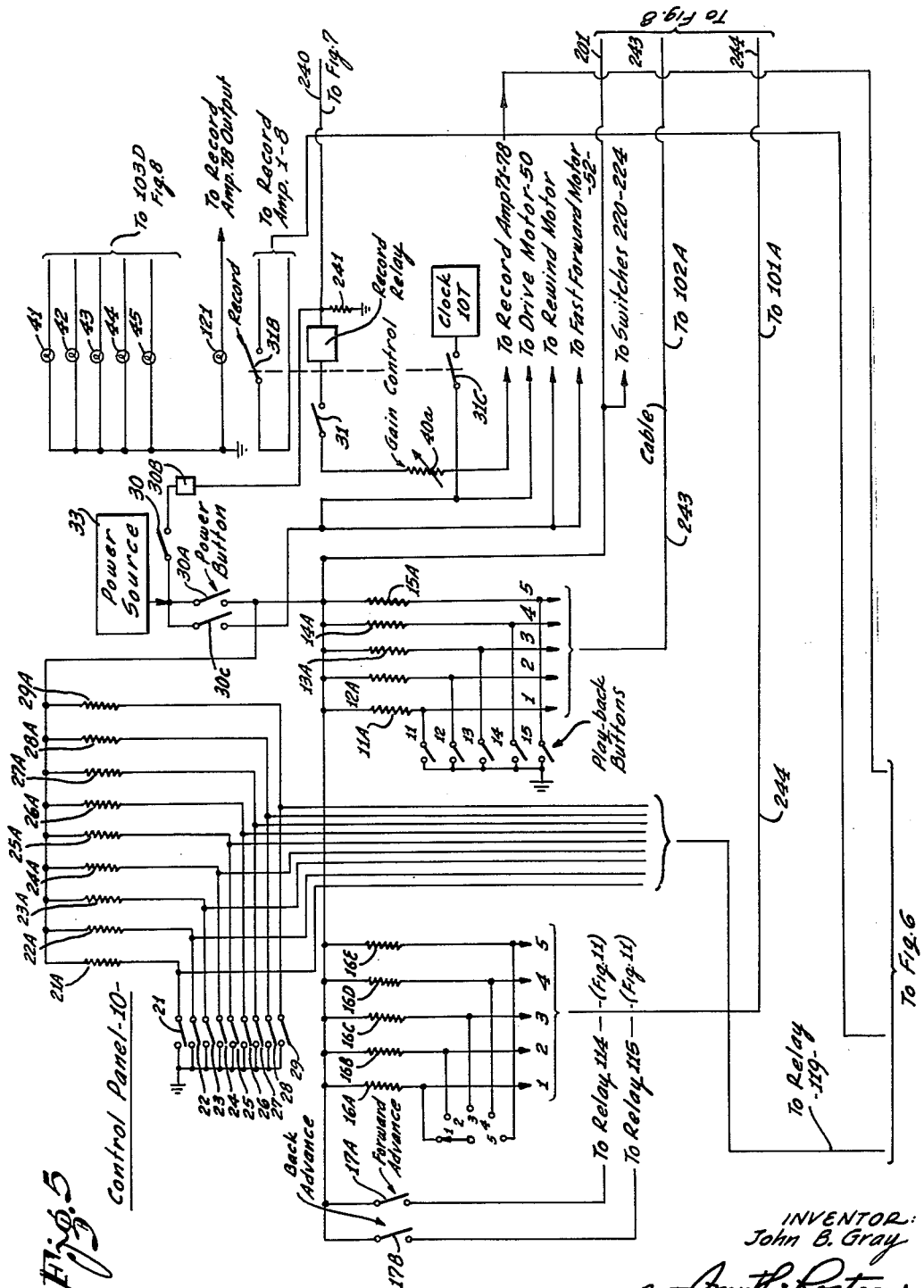

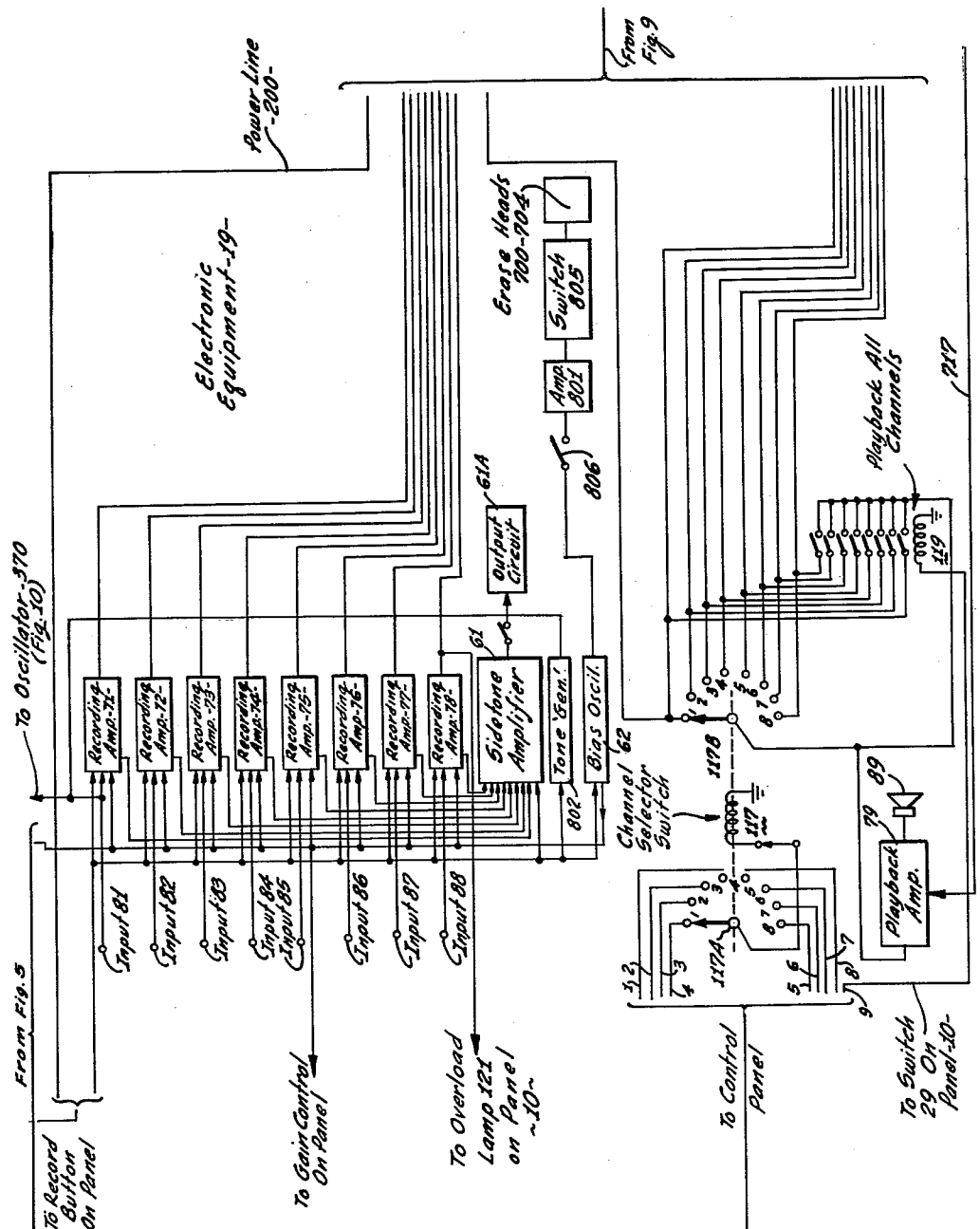

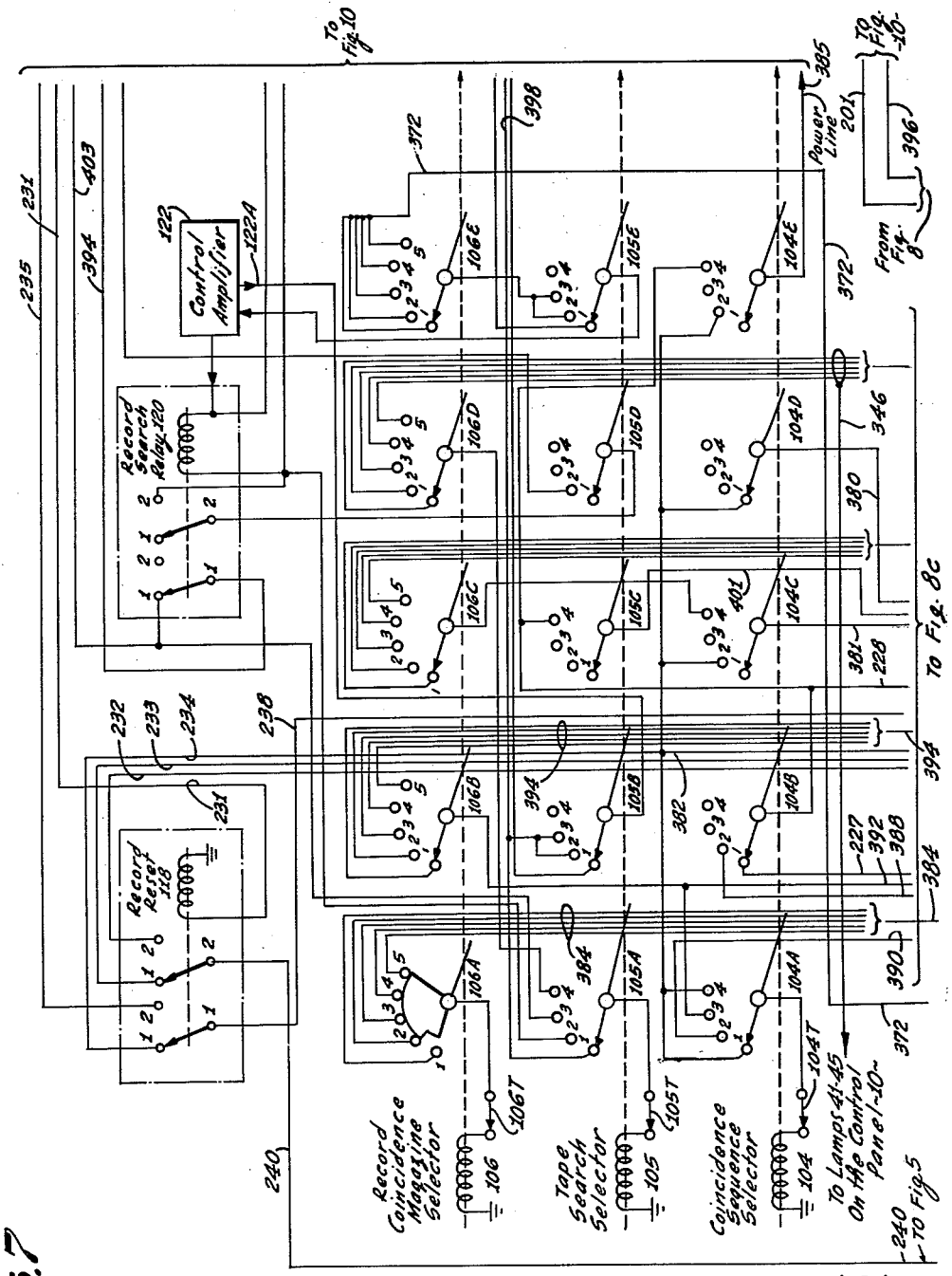

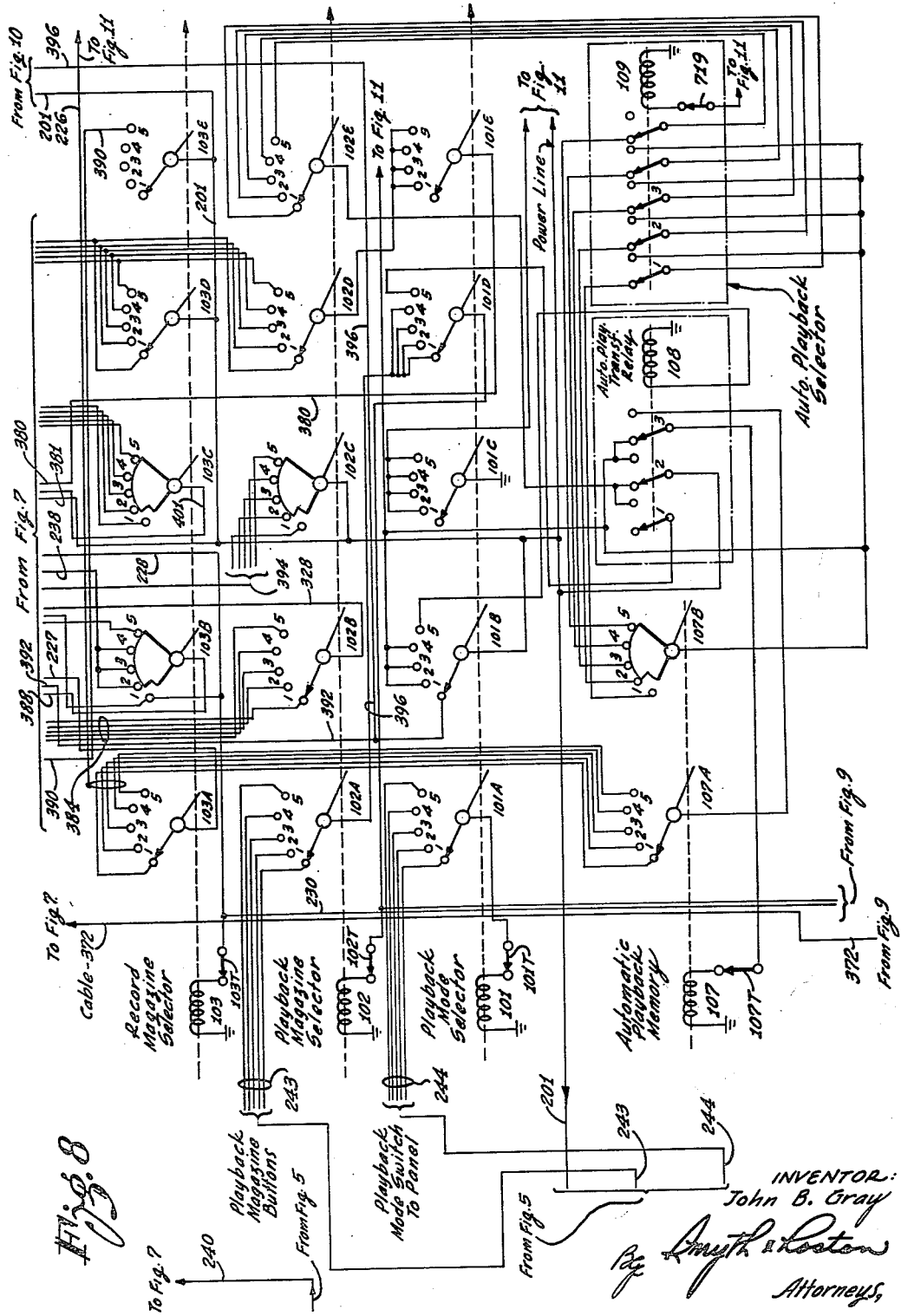

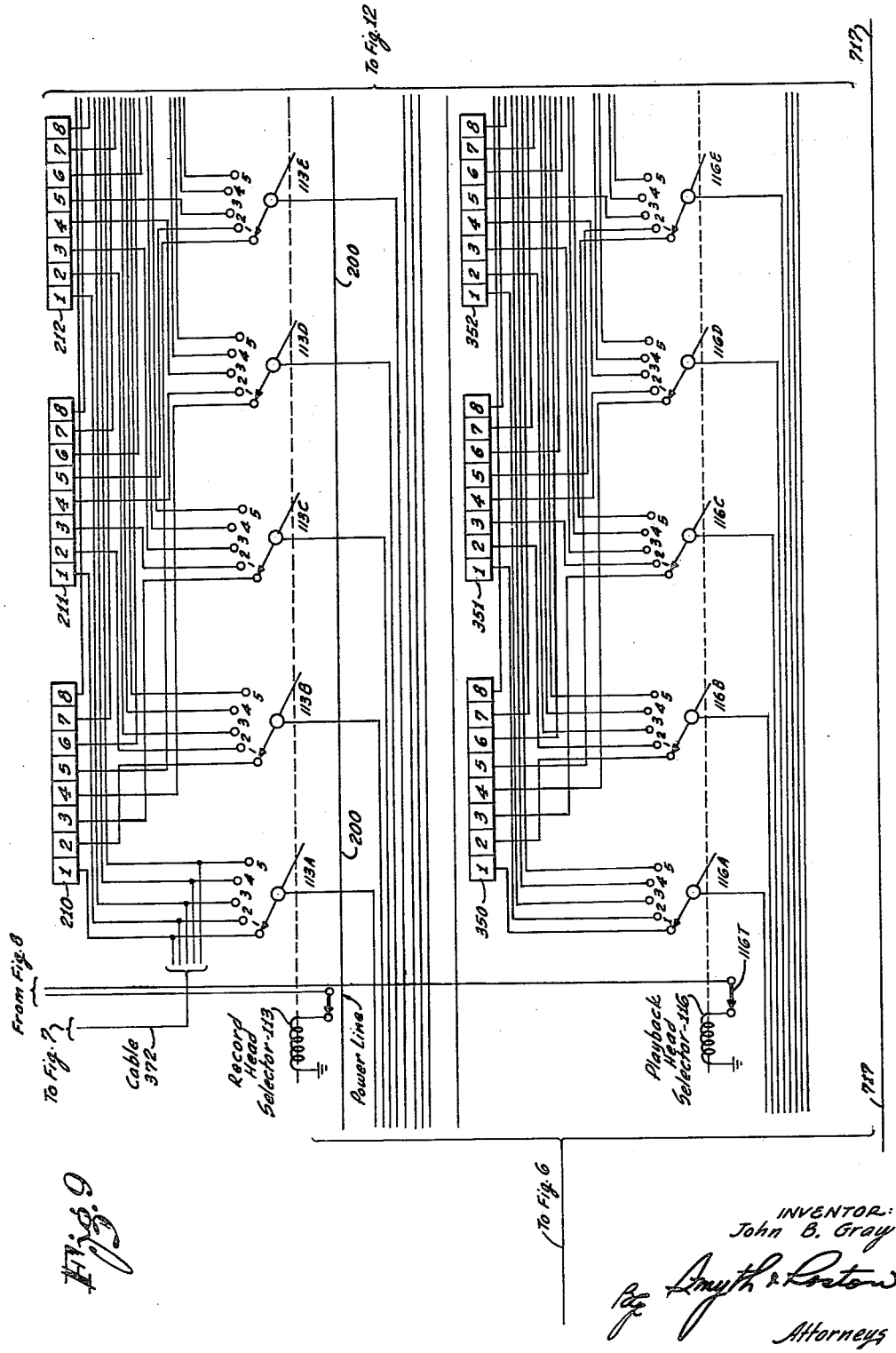

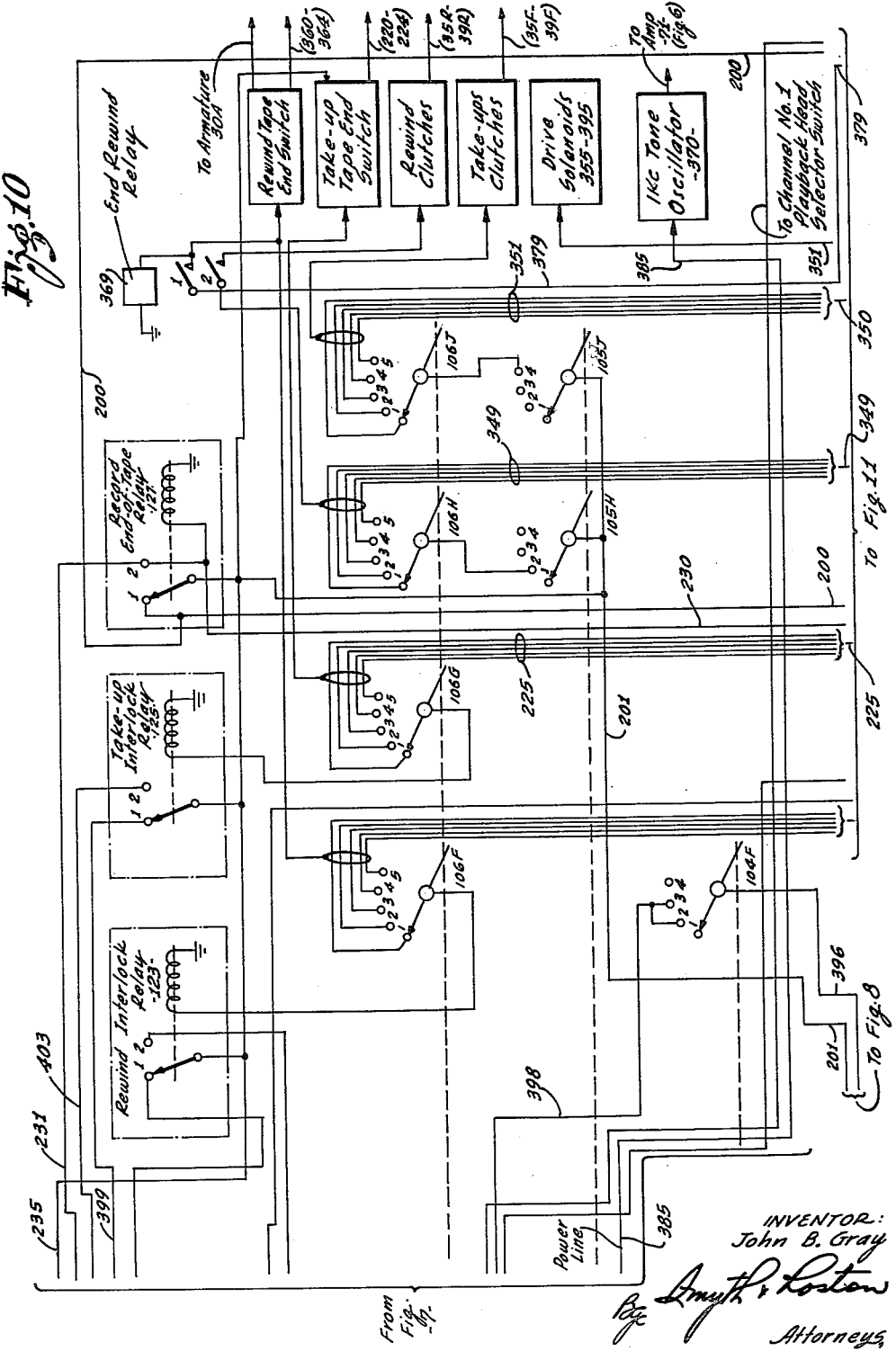

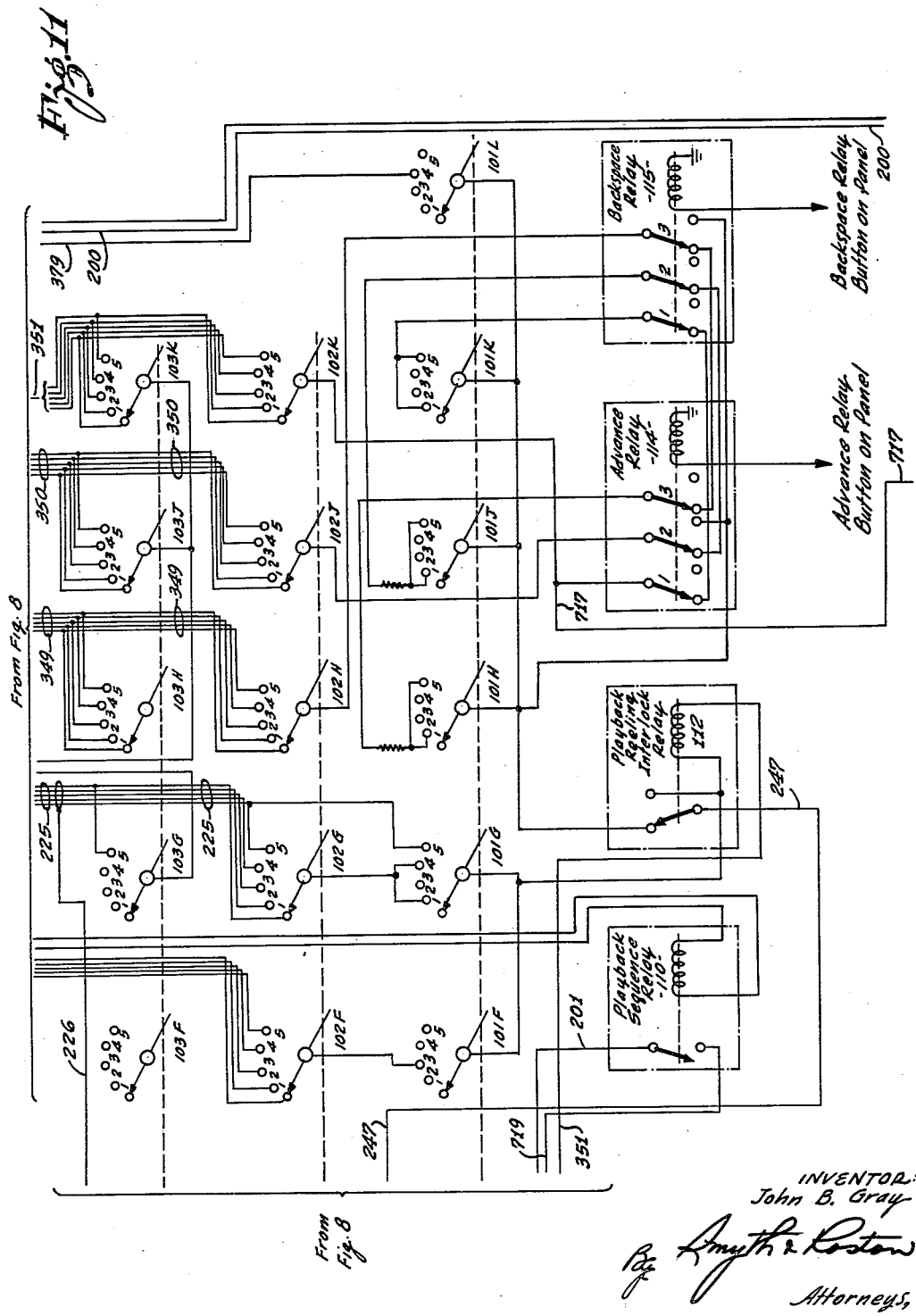

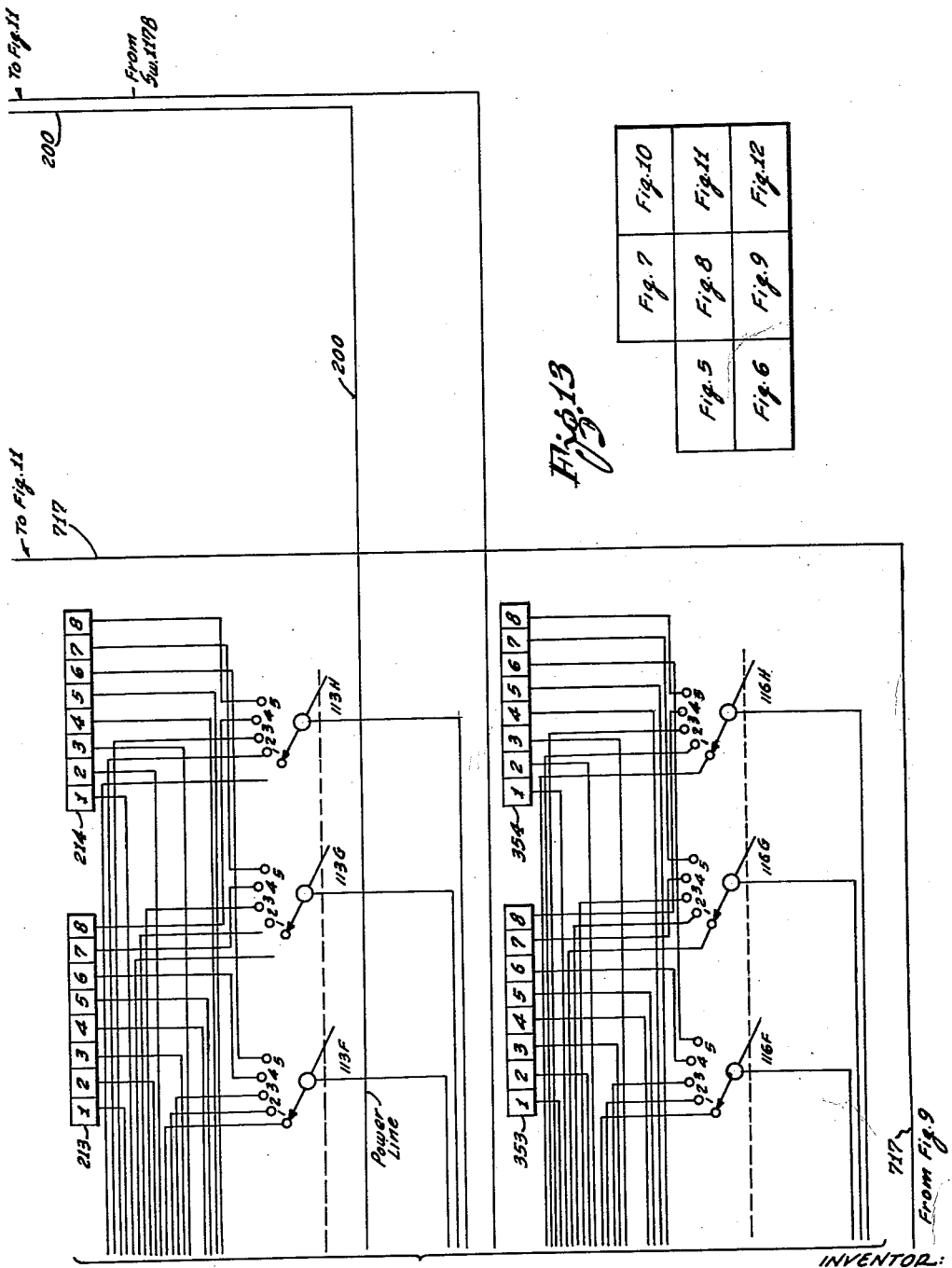

United States Patent Office 3,109,898
Patented Nov. 5, 1963

3,109,898
TAPE FEED MECHANISM
John B. Gray, Los Angeles, Calif., assignor to Packard-Bell Electronics Corporation, Los Angeles, Calif., a corporation of California
Filed Nov. 9, 1959, Ser. No. 851,706
10 Claims. (Cl. 179—100.2)

This invention relates to recording and reproducing equipment and, more particularly, to multi-channel recording and reproducing equipment which utilizes a number of magnetic tapes.

There are many applications in which continuous recording of a number of signals is required over a relatively long period of time. During this relatively long period of time, it may be desirable to reproduce or play back a portion of the recorded signals. When continuous magnetic tape is utilized as the recording medium, a substantial interval may elapse to hunt for the portion to be reproduced. For example, the apparatus may be required to record eight hours of continous information and after seven hours of recording, it is desired to play back the signals recorded during the first hour. In conventional recording and reproducing equipment, it is necessary to rewind the magnetic tape to the portion utilized for recording the first hour of information. For many applications, such a delay is highly undesirable.

Moreover, in some applications, it is desirable not to interrupt the recording sequence in order to reproduce portions of the already recorded information. For such applications, the utilization of conventional equipment which records the information on a continuous magnetic tape is impossible.

In a specific illustrative embodiment of this invention, a number of magnetic tape magazines are utilized for successively recording the input information in a number of different recording channels. The recording and reproducing appartus may, for example, be utilized in an aircraft to provide a continuous recording of different characteristics of the aircraft in the different recording channels. The recording is continuous with the magazines automatically becoming operative in succession.

Features of this invention relate to the provision of control means for successively operating the magazines to provide for a continuous recording of the input information. Each of the magazines includes an internal pinch roller for engaging the magnetic tape. A drive capstan common to all of the magnetic tape magazines, is continuously rotated and the magazines become operative when these internal pinch rollers engage the magnetic tape between the pinch roller and the rotating common capstan. The pinch rollers are individually controlled by associated solenoids which are part of the control means. The utilization of an internal pinch roller, which is remotely controlled, is an important feature of the invention.

When information is being recorded on the tape in any magazine, the information recorded in any other magazine may be reproduced without interrupting the recording sequence. Moreover, means are provided for reproducing the information recorded on a tape which is still being utilized for recording the input information. This feature is accomplished by utilizing a standby magazine to which the input information is switched when the information to be reproduced is on the same tape which is receiving the input information. At the end of the reproducing sequence, the input information is switched back to the original tape which was recording the information. The searching time to find any portion of the recorded signals and to begin reproducing the signals is quite brief, less than 30 seconds, even when a switching sequence is required to the standby magazine.

Other features of this invention pertain to the provision of means for recording a control tone below the frequency band of the input signals to be recorded. The low frequency control tone is continuously recorded with the input signals and is utilized to find the end of the recorded signals on the original tape. When the input signals are switched back to the original tape at the end of the reproducing sequence, they are recorded on the portion of the original commencing at the end of the previously recorded signals. When the reproducing sequence is terminated a high-speed reeling sequence is initiated for locating the termination of the recorded signals on the original tape. During the high speed reeling the control tone is effectively multiplied to a frequency detectable by amplifier means which controls the switching operation.

Further features of this invention relates to the provision of means for briefly recording a tone of predetermined frequency on the magnetic tape as an indication that the input information is being switched to the standby tape. The tone is also briefly recorded on the standby tape to indicate that the input information is being switched back to its original tape.

The entire recorded information, including the information on the standby tape, may be reproduced in proper sequence after recording is completed. The tapes are automatically reproduced one after another, with the detection of the briefly recorded tone initiating a switching operation to the standby tape. The reproducing sequence is uninterrupted with the information being supplied from the standby tape instead of the tape including the briefly recorded tone. When the briefly recorded tone on the standby tape is detected, the switching sequence is reversed so that the information is reproduced again from the original tape. In this manner, the reproducing sequence of the entire recorded information is automatic.

Further features and advantages of this invention will become apparent upon consideration of the following description when read in conjunction with the drawing wherein:

FIGURE 2 is a pictorial view of the main unit of the recording and reproducing apparatus of this invention with a portion of the upper magazine and control mechanism removed;

FIGURE 3 is a pictorial view of one of the tape magazines utilized in the recording and reproducing appartus of this invention;

FIGURE 4 is a pictorial view of the main unit of the recording and reproducing appartus of this invention with a portion of the unit removed and illustrating in particular some of the tape control mechanism;

Figure 1:
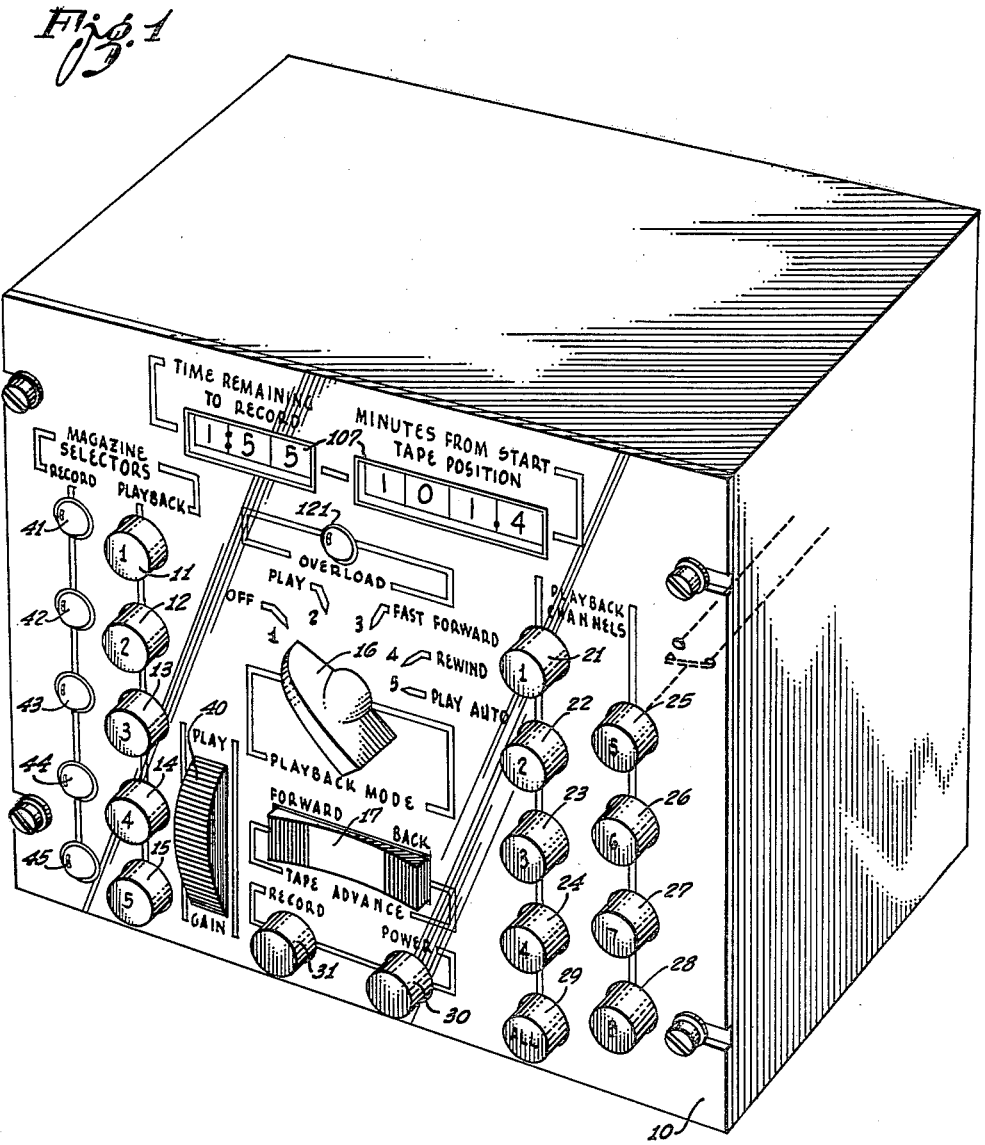
FIGURE 1 is a pictorial view of a control panel which may be remotely located and which is utilized for controlling the operation of the recording and reproducing apparatus of this invention.

FIGURES 5 through 12, when arranged in accordance with the FIGURE 13, are a circuit representation of the recording apparatus of this invention; with FIGURE 5 being a circuit representation of the control panel;

FIGURE 6 being a circuit representation of the electronic equipment section of the main unit; and FIGURES 7 through 12 being a circuit representation of the control mechanism portion of the main unit; and FIGURE 13 is a diagram illustrating the arrangement of FIGURES 5 through 12.

The recorder and reproducer of this invention includes four main components: (1) a remote control panel 10 which is depicted in FIGURE 1; (2) a magazine control mechanism 18 which is depicted in FIGURES 2 and 4; (3) a tape magazine section 29 depicted in FIGURES 2 and 3; and (4) electronic equipment 19 depicted in FIG- URE 2. The magazine section 29, the control mechanism 18 and the electronic equipment 19 together form a main package shown in FIGURE 2 which may illustratively have the dimensions of 12¾ inches wide, 6½ inches high and 18 inches deep, and it may weigh approximately 33 pounds. The tape recorder provides illustratively for eight hours of recording time with the recording tape being in four separate parts in four magazines 35, 36, 37 and 38 included as part of the magazine section 29. The four magazines 35 through 38 and a standby magazine 39 are utilized in the illustrative embodiment of this invention being positioned one on top of another in compartments of the magazine section 29. The specific embodiment of this invention is described with reference to the five magazines 35 through 39. A larger or smaller number of magazines may be utilized. The overall dimensions of each of the magazines may be 10 inches long, 6½ inches wide and 1½ inches high. Release buttons 35a through 39a on the front of the respective magazines 35 through 39 control latching mechanism not shown which is conventional to permit the easy removal of the magazines from the magazine section 29.

As is hereinafter described and as depicted particularly in FIGURE 3, the various control elements in each of the five magazines 35 through 39 are at a minimum. The five magazines 35 through 39 are similar and equipment such as the recording heads 210 through 214, the reproducing heads 450 through 454, the erasing heads 700 through 704 and the solenoids 35S through 39S are all external to and not part of the magazines 35 through 39. These components are all described in detail during the description of the operating sequences of the apparatus. In order to illustrate the simplicity of the magazines 35 and 39, a tabulation of the main components included in the magazine 35 is given below. These components are also described in detail during the description of the operating sequences of the apparatus. The tabulation indicates that the control elements for moving the tape and recording and reproducing signals on the tape are all external to the magazines.

(1) A magnetic tape 68 which may be 1,200 feet long, ¾ of an inch wide of the type 2 mil Mylar tape;

(2) A take-up reel 34 and a rewind reel 33;

(3) A pair of fine-pitch gears 34a and 33a at the base of the reels 34 and 33 respectively for connecting the reels to an external driving system when the magazine is in position;

(4) A tape position counter 35c, which is driven by a counter gear train coupled to the tape to provide a numerical indication through a window (FIGURE 2) on the magazine 35;

(5) Tape end switches 220 and 360, not shown in FIGURES 2 and 3, which are controlled by metal-foil strips, also not shown, on the magnetic tape 68 to indicate when the respective ends of the tape are reached;

(6) A rotatable capstan pinch roller 66 which is rotated by the external solenoid 35S;

(7) A magazine release mechanism, not shown, controlled by the release buttons 35a (FIGURE 2);

(8) Tape guides 35D; and (9) An electrical connector 35E.

As indicated above, these nine components will be further described during the description of the operating sequences of the recording and reproducing apparatus of this invention.

The various components of the magazines 35 through 39 and of the rest of the recording and reproducing apparatus are described with reference to four operating sequences of the apparatus:

(1) Continuous recording;

(2) Playback of one magazine while recording in another;

(3) Simultaneous recording and playback of the same magazine; and (4) Automatic playback.

*Continuous Recording*

The recording and reproducing apparatus of this invention may be operated to provide for a continuous recording of input information on the five magnetic tapes of the tape magazines 35 through 39. To initiate the operation of the recording and reproducing apparatus to provide for the continuous recording sequence, a power button 30 on the control panel 10 illustrated in FIGURE 1, is first depressed. The power button 30 which is also depicted in FIGURE 5, closes and latches a path from a power source 33 to energize a power relay 30B. The relay 30B remains energized until the button 30 is again depressed or until it is released at the end of the continuous recording sequence. FIGURE 5, which forms part of the circuit arrangement of the recording and reproducing apparatus of this invention depicted in FIGURES 5 through 12 when arranged in accordance with FIGURE 13, is a circuit representation of the control panel 10. FIGURE 6 is a functional arrangement of most of the electronic equipment 19, and FIGURES 7 through 12 are a circuit representation of the control mechanism 18.

The operation of two armatures 30A and 30C of the power relay 30B energizes essentially the entire recording and reproducing apparatus except for the electronic equipment 19 depicted in FIGURE 6. The equipment 19 is energized, as is hereinafter described, when a record button 13 on the control panel 10 is depressed. More particularly, when the power relay 30B is energized, it energizes three motors 50, 51 and 52 in the control mechanism 18 (FIGURE 4) over an operating path through the armature 30C. The source 33 may provide 115 volt-400 cycle power through the armature 30C and 28 volts direct-current through the armature 30A. The motor 50 is the drive motor for rotating a capstan 62 by means of a gear linkage 63.

The driver motor 50 may be a 400 cycle synchronous motor which is coupled by the gear linkage 63 to a fly wheel assembly 63F and to the capstan shaft 62. A mechanical filter, not shown, in the output of the gear linkage 63 reduces the flutter content of the drive. The capstan shaft 62 is rotated at an illustrative speed of 71.6 revolutions per minute to provide, as is hereinafter described, for a tape recording speed of 1⅞ inches per second. The capstan 62 is positioned adjacent all five of the magazines 35 through 39 which form part of the magazine section 29. None of the five magnetic tapes 68 respectively included in the magazines 35 through 39 are, however, moved just due to the rotation of the capstan shaft 62. The capstan shaft 62 continues to rotate as long as power is supplied through the armature 30C of the power relay 30B. The magazines 35 through 39 may be individually energized or any combination thereof may be energized as is hereinafter described. Moreover, the direction of movement and the speed of movement of the tapes in different magazines may be different.

As indicated above, in addition to the tape drive motor 50, the power relay 30B also energizes two motors 51 and 52. The motors 51 and 52 are the reel drives for rotating respectively the five payout or rewind reels 33 and the five take-up reels 34. As tabulated above, each of the five magazines 35 through 39 has a payout reel 33 and a take-up reel 34. Each of the motors 51 and 52 may be similar to the motor 50 being a 400 cycle induction motor. The motors 51 and 52 respectively drive output shafts through gear trains. The output shaft of the motor 51 supports five fluid magnetic clutches 35R through 39R, which are individually associated with the magazines 35 through 39, and the output shaft of the motor 52 supports five fluid magnetic clutches 35F through 39F, which are also individually associated with the magazines 35 through 39.

Each of the clutches 35R through 39R and 35F through 39F supports a gear for engaging an associated reeling gear train in the magazines to provide a direct coupling to the associated reels. In FIGURE 3, the payout reel 33 of the magazine 35 is driven by a gear 33A and the take-up reel 34 is driven by a gear 34A. The gears 33A and 34A mesh respectively with gears on the magnetic clutches 35R and 35F in FIGURE 4 when the magazine 35 is in position in the magazine section 29.

The amount of power transmitted to the reels 33 and 34 in each of the magazines 35 through 39 is determined by the energization of their associated magnetic clutches. When power is turned on by the button 30, the magnetic clutches 35R and 35F are energized for the normal drive condition and the rest of the magnetic clutches 36R through 39R and 36F through 39F are in a braking condition so that their associated reels do not rotate. The fluid clutches 35R and 35F are energized at the same time that the solenoid 35S (FIGURES 3 and 4) associated with magazine 35 is energized.

The solenoid 35S is one of five solenoids 35S through 39S which are individually associated with the five magazines 35 through 39. The solenoids 35S through 39S are part of the control mechanism 18 and are, therefore, external to or not part of the magazines 35 through 39. The solenoid 35S is positioned adjacent a pivoted arm 65 (FIGURE 3) of the internal pinch roller 66 of the magazine 35. The pinch roller 66 is an internal pinch roller in that it forms part of the magazine 35 and is on the opposite side of the magnetic tape 68 as is the rotating capstan 62. The pinch roller 66 rotates in a clockwise direction to pinch or engage the magnetic tape 68 between the roller and the rotating capstan shaft 62. With only the solenoid 35S of the five solenoids 35S through 39S energized, only the tape 68 in the magazine 35 is driven by the drive motor 50.

The five drive solenoids 35S through 39S, the five magnetic clutches 35R through 39R and the five magnetic clutches 35F through 39F are functionally depicted in FIGURE 10. The five drive solenoids 35S through 39S are individually connected to the five terminals 1 through 5 of a pole or deck 103K. The pole 103K is one of ten poles of a wafer stepping switch 103. The control mechanism 18, which is depicted in FIGURES 7 through 12, includes a number of similar wafer switches which can be stepped from position to position. The wafer switch 103 is a record magazine selector switch in that it is set at a position corresponding to the magazine which is being utilized to record the input information. At the initiation of the recording sequence, the magazine selector switch 103 is set at position 1 to indicate the magazine 35 is being utilized. A conductive path is, therefore, provided from the solenoid 35S through terminal 1 of the pole 103K but not from the other four solenoids 36S through 39S. The path from the solenoid 35 is through the pole 103K, a lead 200, a normal armature of a relay 127, a power lead or line 201 and the power armature 30A to the source 33. When the power relay 30 is operated, the solenoid 35S is therefore energized to rotate the pinch roller 66 in the magazine 35 so as to drive the magnetic tape 68 of the magazine 35.

The five rewind clutches 35R through 39R are connected respectively to the five terminals 1 through 5 of the pole 103H of the magazine selector switch 103, and the five take-up clutches 35F through 39F are connected individually to the five terminals 1 through 5 of the pole 103J of the switch 103. The armature of the poles 103H and 103J are multipled through the lead 200 to the source 33 over the same path described above for the solenoid 35S, so that the clutches 35R and 35F are energized. With the clutches 35R and 35F and the solenoid 35S energized, the magnetic tape 68 of the magazine 35 is driven at a speed of 1⅞ inches per second adjacent the recording head 210 of the control mechanism 18. The recording head 210 is a composite wafer structure of eight heads 1 through 8 and is individually associated with the magazine 35. Corresponding composite heads 211 through 214 are individually associated with the magazines 36 through 39. Each of the composite heads 210 through 214, also depicted in FIGURES 9 and 12, has eight recording heads 1 through 8 because eight channels are recorded on the magnetic tape 68. The present invention is not restricted to any number of channels as it is apparent that more or less may readily be utilized.

Though the tape 68 in the magazine 35 begins moving when the power button 30 is depressed, signals are not introduced to the recording head 210 so that actual recording does not commence just by depressing the power button 30. In order to initiate the actual recording of the input information, a record button 31 (FIGURES 1 and 5) on the control panel 10 is closed. The record button completes a path from the power source 33 through armature 30A of the power relay 30B to energize a record relay 31A.

One terminal of the winding of the relay 31A is connected to the button 31 and the other to a grounded resistor 241. The button 31 latches operated and may be released by depressing it again. When the relay 31 operates, it completes a path for the 400 cycle voltage from the source 33 through the operated armature 30C and the now operated armature 31C to a clock mechanism 10T. The clock mechanism 10T provides an indication through windows on the control panel 10 of the elapsed duration of the recording sequence and the time remaining to record.

When the relay 31 operates, it also closes a path from the source 33 through armature 30A of relay 30B, the power lead 201 and the power lead 200 through armature 31B of the record relay 31A to eight recording amplifiers 71 through 78 (FIGURE 6) to a side tone amplifier 61, to a tone generator 802, and also to a bias oscillator 62. The recording amplifiers 71 through 78 are energized in this manner to amplify input signals respectively received through eight leads 81 through 88. The amplifiers 71 through 78 may be conventional type amplifiers utilized for recording electrical signals on magnetic tape. Eight recording amplifiers 71 through 78 are provided because as indicated above, eight channels of information are recorded on each of the magnetic tapes 68.

The amplified signals from the recording amplifiers 71 through 78 are respectively provided through the poles 113A through 113H to the eight recording heads 1 through 8 of the composite recording head 210. There are five composite heads 210 through 214, as described above, and illustrated in FIGURE 4, which are respectively positioned adjacent the magnetic tapes 68 in the magazines 35 through 39. Each of the recording heads 210 through 214 may be a sandwich or wafer arrangement including eight recording heads for providing the eight longitudinal channels of recorded information on the magnetic tape 68. The poles 113A through 113H, inclusive, are part of a record head selector switch 113 which operates together with the recording magazine selector switch 103. Both switches are always at the same position. At the initiation of the continuous recording sequence, the switches 103 and 113 are both at position 1.

The tone generator 802, which is energized with the record relay 31A, provides a 50 cycle per second tone to the input lead 81. The 50 cycle tone insures the continuous recording of signals in the first channel. The 50 cycle tone is below the pass band of the input audio signals and so it does not interfere with normal recording or reproducing of the signals. As is hereinafter described, the 50 cycle tone is utilized during high speed reeling of a tape 68, to locate the termination point of the recorded signals on the tape. This high speed reeling automatically occurs after a standby recording sequence utilizing the magazine 39.

The signals from the amplifier 78 are provided to an overload indicator 121 on the panel 10 as well as to the composite head 210. The indicator 121 provides a visible indication to the operator of the output level of the signals to the composite recording heads 210. A gain control dial 40 (FIGURE 1) on the control panel 10 may be rotated to adjust the gain. The dial 40 controls the setting of a potentiometer 40B which is coupled in a biasing circuit from the power source 33 to the eight amplifiers 71 through 78. The gain of all eight amplifiers may, in this manner, readily be adjusted.

The recording sequence continues in this manner with the signals through leads 81 through 88 being respectively recorded by the heads 1 through 8 of the composite magnetic head 210 along longitudinal tracks of the tape 68 (FIGURE 3) of the magazine 35. The other four magnetic tapes 68 in the magazines 36 through 39 are stationary at this time.

The input signals recorded in each of the tracks of the tape 68 may be audio frequency signals in the range from 200 to 4,000 cycles per second. A sidetone amplifier 61 is provided which is coupled to each of the recording amplifiers 71 through 78 so that the signals being recorded can be listened to. The amplifier 61 is coupled through a switch to output circuits 61A which may include a speaker. The output from the amplifier 61 may, illustratively, have a maximum magnitude of 3 volts and present an impedance of 75 ohms. Supersonic bias is utilized which is supplied from the bias oscillator 62.

The oscillator 62 also can be utilized to erase the signals recorded on any of the tapes 68. A switch 806, which is not on the control panel 10, is open during the continuous recording sequence so that erasure does not take place. The erasure sequence is hereinafter described.

At the end of the magnetic tape 68 in the magazine 35, the control mechanism 18 automatically steps the input signals to the composite magnetic head 211 which is positioned adjacent the magnetic tape 68 of the magazine 36 instead of the composite head 210. The magazine 36 is also automatically energized and the magazine 35 is de-energized to switch the recording sequence from the magazine 35 to the magazine 36. Toward the end of the magnetic tape 68 in the magazine 35, a metallic member, not shown, carried by the tape 68, operates the tape end switch 220 which is individually associated with the magazine 35. There are five tape end switches 220 through 224 which are individually associated with the magazines 35 through 39 and which are shown functionally in FIGURE 10. When the tape end switch 220 is closed, it completes a path from the power lead 201 through the switch 220, through cable 225 and cable 226 to terminal 1 of the pole 103A of the record magazine selector switch 103. The armature of the pole 103A is connected through to the interrupter 103T of the switch 103. When the tape end switch 220 is operated, it therefore energizes the record magazine selector switch 103, and also the record head selector 213 by means of a connection through the lead 230 from the winding of the switch 220. The two switches 103 and 113 are operated, in this manner, in parallel. When the selector switches 103 and 113 are energized, they are stepped from position 1 to position 2. The record magazine selector switch 103 selects the magazine 36 instead of the magazine 35 and the selector switch 113 selects the composite magnetic head 211 instead of the composite magnetic head 210 for recording the input information.

Rewind clutch power is delivered through the pole 103H to the magnetic clutch 36R, take-up clutch power is delivered through the pole 103J to the magnetic clutch 36F and the end of tape relay 127 to the magnetic clutch 36R and drive solenoid power is delivered, as described above, through the pole 103K to the solenoid 36R. As the armatures of poles 103H, 103J and 103K step from position 1 to position 2, they also remove power from the clutches 35R and 35F and from the solenoid 35S so that the tape 68 and the reels 33 and 34 in the magazine 35 are halted.

The sequence continues in this manner with magazine after magazine being energized until the tape end switch 224 is operated at the end of the magnetic tape 68 of the magazine 39. As is hereinafter described, the magazine 39 may be utilized during the playback sequence for recording input signals. During the continuous recording sequence, only the remaining unrecorded portion of the tape 68 in the magazine 39 is utilized. When the switch 224 is operated at the end of the tape 68 in the magazine 39, it energizes the end of tape relay 127 and a reset relay 118 to halt the recording sequence and turn off the power returning the recording and reproducing apparatus to normal. The operating path for the relay 127 is from the switch 224, through pole 103G and lead 230 to the winding of relay 127. The operating path through lead 230 is also extended through a lead 231 to the winding of the reset relay 118 causing it to operate.

When the relay 127 operates, it extends a connection from the power line 201 through its operated armature and contact 2 to the lead 231 to lock the record reset relay 118 in its operated condition. The relay 127 is also locked-operated by the locking path through its operated armature. When the record reset relay 118 operates, it returns the record magazine selector switch 103 and the record head selector switch 113 to position 1 and it also releases the record relay 31A and the power relay 30B to remove power from the recording amplifiers 71 through 78 and from the control mechanism 18. When the record reset relay 118 operates, it connects the power line 201 through a lead 235 and contact 2 of its operated armature 1 to a lead 238. The lead 238 is multipled to the three terminals 2, 3 and 4 of the pole 103B of the selector switch 103. The armature of the pole 103B simultaneously contacts four of the five terminals 1 through 5 at each position. With the record magazine selector switch 103 in position 5 at the end of the recording sequence, power is coupled through terminal 1 of the pole 103B to the winding of the selector switch 103 and the winding of the selector switch 113 causing them to step from position 5 to position 1. As indicated above, the selector switches 103 and 113 are cyclically operated stepping switches which successively step from position to position each time their windings are energized and which step from the last position at position 5 to the first position at position 1 when energized at position 5.

When the record magazine selector switch 103 steps to position 1, its operating power through terminal 103B is open. A connection, however, is completed through the pole 103B to terminal 5 thereof and thence through lead 232 and the operated armature 2 of the record reset relay 118 to a lead 240. The energized lead 240 is connected to the grounded resistor 241 at one side of the record relay 31A and the power relay 30B. The record relay 31A, as described above, was energized when the record button 31 was closed, and the power relay 30B was energized when the power button 30 was closed. With potential at both sides of the winding of the relays 31A and 30B, the relays 31A and 30B de-energize and open respectively the armatures 31B, 31C, 30A and 30C. When the armature 31B is opened, it opens the connection to the record amplifiers 71 through 78, to the side tone amplifier 61 and to the biasing oscillator 62 causing them to return to normal. When the armature 31C is opened, it stops the clock 10T. When the armature 30C is opened, it de-energizes the motors 50, 51 and 52, and when the armature 30A is opened, it de-energizes the rest of the control mechanism 18. In this manner, when the record reset relay 118 operates, it normalizes the selector switches 103 and 113 and it removes power from the control mechanism 18 and from the electronic equipment 19.

The record reset relay 118 and the end of tape relay 127 remain operated as long as the power button 39 is closed and the relay 30B is operated. The relays 118 and 127 release when, however, power is removed at the open armature 30A. To initiate another recording sequence, the magazines 35 through 39, inclusive, may be changed or the magnetic tapes 68 may be erased so that they can be utilized for another recording sequence.

*Normal Playback*

During the continuous recording sequence, information which has already been recorded may be reproduced or played back. Information may also be played back after the continuous recording sequence has terminated. The following sequence of operations occurs when the information to be reproduced is in a magazine which is not the same as the one being utilized for recording the input information. The sequence of operations for recording and playing back from the same magazine is subsequently described.

In order to initiate the normal playback sequence, the magazine which is to be reproduced is selected by the push buttons 11 through 15 and the desired playback operation is selected by a playback mode switch 16. The buttons 11 through 15 and the switch 16 are both on the control panel 10 (FIGURES 1 and 5). The playback mode switch 16 has five positions 1 through 5 which respectively are "off," "play," "fast-forward," "rewind" and "play-auto." For the normal playback sequence, the playback mode switch 16 is moved to its position 2, the "play" position. Let us assume that the magazine 37 is receiving the input signals at the time that playback is initiated, and that information which was recorded on magazine 35 is to be reproduced. The playback buttons 11 through 15 correspond respectively to the magazines 35 through 39. The lights 41 through 45 on the control panel also correspond to the magazines 35 through 39 and provide indication of which magazine is being utilized to record the input signals. The lamps 41 through 45 are selectively energized over a path from the power lead 201 through the pole 103D of the switch 103 and cable 246 (FIGURE 7). With the magazine 37 being utilized, the switch 103 is in position 3 and the light 43 on the control panel 10 is energized.

To select the magazine 35 for the normal playback sequence, the playback button 11 is depressed. When the button 11 is depressed, it grounds a path from the power source 33 through armature 30A and a resistor 11A which is connected through a cable 243 to terminal 1 of the pole 102A of a playback magazine selector switch 102. The armature of the pole 102A is connected to terminals 1 through 4 of the pole 101D of the playback mode switch 101. The position of the playback mode switch is controlled by the switch 16 on the control panel 10. When the switch 16 is set to its position 2, the play position, as shown in FIGURE 5, it grounds a path from the power source 33 through the armature 30A and a resistor 16A which is connected through a cable 244 to terminal 2 of the pole 101A. The armature of the pole 101A is connected by the interrupter 101T to the winding of the switch 101. The switches 101 and 102 step when potential is removed from their windings. When the power relay 30B is operated, the windings of switches 101 and 102 are energized but the switches do not step until the power is interrupted. When the switch 16 moves from position 1 to position 2, it provides a pulse to the winding of switch 101 which step at the termination of the pulse to position 2. With the switch 101 at its position 2, the grounded connection through the pole 102A of the magazine selector switch 102 from the button 11 is extended to the winding of the selector switch 102 causing it to home to the position 1 if it is not thereat. The only one of the five terminals 1–5 of the pole 102A that is grounded is the terminal 1.

The tape control elements for the playback sequence are selected by the poles 102H, 102J and 102K of the switch 102 and the operation mode is selected by the poles 101H, 101J and 101K of the switch 101. The six poles 102H, 102J, 102K, 101H, 101J and 101K actually perform the same function that the three poles 103H, 103J and 103K of the magazine selector switch 103 performs for the recording sequence. The poles 103H and 101H control the energization of one of the rewind clutches 35R through 39R; the two poles 102J and 101J control the energization of one of the take-up clutches 35F through 39F and the two poles 102K and 101K control the energization of one of the drive solenoids 35S through 39S.

Power is supplied to the armatures of the three poles 101H, 101J and 101K from the lead 201 over a path through the pole 101B at position 2, lead 247 and the normal armature of a playback interlock relay 112. With the mode selector switch 101 at position 2 and the magazine selector switch 102 at position 1, power is supplied through the pole 101H, a resistor 130, the normal armature 3 of an advance relay 114, the normal armature 3 of a backspace relay 115, the pole 102H and cable 349 to the rewind clutch 35R. The rewind clutch 35R is, in this manner, energized to drive the take-up reel 34 to the magazine 35. Potential is provided through the pole 101J, a resistor 131, the normal armature 1 of the backspace relay 115, the normal armature of the advance relay 114, and the pole 102J and the cable 350 to the take-up clutch 35F. The take-up clutch is, in this manner, energized to drive the payout reel 33 of the magazine 35. Potential through the leads 201 and 247 is also provided through the pole 101K, the normal armature 1 of the backspace 115, the normal armature 1 of the advance relay 114, the pole 102K and cable 351 to energize the drive solenoid 35S. The drive solenoid 35S rotates the pinch roller 66 of the magazine 35 to engage the tape 68 against the continuously rotating capstan 62. The operating path to the drive solenoid 35S has a branch through a lead 717 which is connected to the armature of the pole 102K. The lead 717 is connected to a playback amplifier 79 in FIGURE 6 so that the amplifier 79 becomes energized at the same time the tape is started. The operation of the amplifier 79 is hereinafter described.

With the clutches 35R and 35F energized and the drive solenoid 35S energized, the tape 68 in the magazine 35 is moved adjacent a composite playback head 350 which is hereinafter described. As is also hereinafter described, the advance relays 114 and 115 override the selected mode by the playback mode switch 101 when they are energized.

In addition to selecting the magazine, one of the eight channels of the magazine tape may be selected or all eight channels may be simultaneously played back. The buttons 21 through 29 on the control panel 10 are utilized for selecting the playback channels. The buttons 21 through 28, inclusive, control the position of a channel selector switch 117, and the button 29 controls the energization of a relay 119. The winding of a playback head selector switch 116 is connected in parallel with the winding of the playback magazine selector switch 102 and is moved to the same position therewith. With the switch 102 at position 1, to play back the signals, the switch 116 is, therefore, also at its position 1. The switch 116 controls the selection of the composite playback heads 350 through 354 (FIGURES 4 and 12). The playback composite heads 350 through 354 are similar to the composite heads 210 through 214 which were briefly described above. The selector switch 116 selects 1 of the five playback heads 350 through 354 and establishes eight connections from its eight heads 1 through 8 to the armatures of the relay 119. As the relay 119 is operated, all eight reproducing heads of the selected composite head 350 are multiplied to the playback amplifier 79, briefly described above. The playback amplifier 79 couples the amplified signals reproduced from the eight channels to a speaker 89. If the relay 119 is not energized and one of the buttons 21 through 28 is depressed, the switch 117 homes to the selected position and the pole 117B of the switch 117 establishes a connection from the selected channel to the playback amplifier 79. All channels or any one of the channels of any one magazine may, therefore, be reproduced.

At the end of the tape 68 of the magazine 35, the tape end switch 220 (FIGURE 10) is operated to provide potential through the cable 225, terminal 1 of the pole 102G, terminal 2 of the pole 101G, through the winding of the interlock relay 112, lead 351 and terminal 2 of the pole 101C to ground. When the relay 112 operates, it opens the path through its armature to the playback mode poles 101H, 101J and 101K which, as described above, couple power to the clutches 35R and 35F, to the solenoid 35S and to the amplifier 79. The tape 68 in the magazine 35 is accordingly halted when the interlock relay 112 is energized. The relay 112 locks operated over a locking path from the power lead 201 through pole 101B, lead 247 and the operated armature of the relay 112. The other side of the winding of the relay 112 is grounded through the pole 101C. As long as the playback mode selector switch 101 remains at position 2, the relay 112 remains energized. When the selector switch 101 is stepped back to position 1, its "off" position, by the playback mode switch 16 on the control panel 10, the relay 112 is released.

*Tape Advance Button 17*

As described above, the advance relay 114 and the backspace relay 115 override the mode selected by the switch 16 on the control panel 10 when they are energized. The advance relay circuit 114 and the backspace relay 115 are both controlled by a tape advance button 17 on the control panel 10. When the right side of the button 17 is depressed, as viewed in FIGURE 1, a back-advance switch 17B, depicted in FIGURE 5, is closed and when the left side of the button 17 is depressed, a forward-advance switch 17A is closed. When the forward-advance switch 17A is closed, it completes an operating path from the power source 33 through the operated armature 30A of the power relay 30B through the switch 17A to the winding of the advance relay 114. The switch 17B completes a similar path to energize the backspace relay 115.

When the advance relay 114 operates, it opens the operating path for the rewind clutch 35R and for the drive solenoid 35S that were operated during the playback sequence. It also opens the power line through the lead 717 to the playback amplifier 79. The advance relay 114 and the backspace relay 115 are only effective during the playback sequence. They do not perform any function with respect to the continuous recording sequence and if a playback sequence is not taking place, their operation as described above, is non-functional. Assuming that the playback sequence of the magazine 35 is taking place, the operation of the relay 114 halts the advance under control of the drive solenoid 35S and the rewind clutch 35R but maintains control by the take-up clutch 35F. The operating paths for the drive solenoid 35S and the rewind clutch 35R are opened respectively at the armatures 1 and 3 of the advance relay 114. The operating path for the take-up clutch 35F is now from lead 247 through the normal armature of the interlock relay 112, the operated armature 2 of the advance relay 114 to the pole 102J.

The path through the operated armature 2 of the advance relay 114 effectively shunts the resistor 131 to increase the power provided to the take-up clutch 35F. The take-up clutch 35F, therefore, drives the take-up reel 33 at a greater speed than its speed during the normal recording or playback sequences. The advance relay 114 remains energized as long as the switch 17A on the control panel 10 is closed. When the switch 17A is opened, it releases the advance relay 114 to restore the original operating paths for the clutches 35R and 35F and the drive solenoid 35S. Normal playback thereupon continues.

When the backspace relay 115 is energized, it opens the operating paths for the take-up clutch 35F and for the drive solenoid 35S and it shunts the resistor 130 to increase the power delivered to the rewind clutch 35R. It also opens the power path to lead 717 and the playback amplifier 79. The power delivered to the rewind clutch is through the lead 247, the normal armature of the interlock relay 112, the operated armature 3 of the backspace relay 115, the pole 102H and cable 349 to the rewind clutch 35R. The paths to the take-up clutch 35F and to the drive solenoid 35S are opened at the armatures 2 and 1 of the relay 115.

As long as the backspace relay 115 remains energized, the magnetic tape 68 of the magazine 35 is rewound at a substantially rapid rate. The greater speed is achieved because the relay 115 effectively shunts the resistor 130 which is serially connected with the rewind clutch 35R during the normal playback sequence. When the backspace relay 115 is released, the overriding rewind sequence terminates with the original operating paths for the clutches 35R and 35F and for the drive solenoid 35S being restored.

In this manner, the advance relay 114 and the backspace relay 115 can be utilized to move the magnetic tape 68 of the magazine from which information is being reproduced either forward or back to any particular location. When the overriding control by the tape advance button 17 on the control panel 10 terminates, the playback sequence automatically resumes with the tape signals being reproduced from the tape 68 at the portion which is positioned adjacent the associated playback heads at the termination of the overriding control.

*Re-Winding the Tape*

To rewind any of the tapes, the playback mode switch 16 on the control panel 10 (FIGURE 1) is moved to its position 4, the rewind position, and one of the magazine selector buttons 11 through 15 is depressed. Assuming that it is the tape 68 in the magazine 35 which is to be rewound, the mode selector switch 16 is first turned to its off position so that the switch 101 homes to position 1. By stepping the switch 101 to position 1, the interlock relay 112 is released if it is operated at this time. The switch 16 on the panel 10 is thereupon moved to position 4 to move the selector switch 101 to position 4. Power is provided through line 201, the pole 101B at position 4, the normal armature of the relay 112, pole 101H at position 4, the normal armature 2 of relay 115, the normal armature 2 of the advance relay 114, pole 102H at position 1, and through cable 349 to the rewind clutch 35R. The connection to energize the rewind clutch 35R shorts the resistor 130 so that a relatively large amount of power is delivered to the clutch to rotate the payout reel 33 at a relatively fast speed. The rewind sequence continues until the rewind tape end switch 360 is operated. The rewind tape end switch 360 is one of five switches 360 through 364 which are similar to the tape end switch 220 through 224 but are operated by the opposite ends of the magnetic tapes 68.

When the rewind tape end switch 360 is operated, it halts the rewind sequence by operating a rewind interlock relay 123. The operating path for the interlock relay 123 is from the switch 360, which is coupled to armature 30A of the power relay 30B for receiving power, and through pole 106F of the coincidence magazine selector switch 106 at position 1 to the winding of the interlock relay 123. When the relay 123 operates, it couples power from the cable 201 through its operated armature to the winding of the record search relay 120 which, however, does not operate at this time. The operation of the relay 120 is hereinafter described.

The rewind tape end switch 360, however, is also connected together with other tape end switches 361 through 364 to the winding of an end rewind relay 369 which operates. When the relay 369 operates, it interrupts at its armature 2, the operating path for the rewind clutch 35R bringing the magnetic tape 68 in the magazine 35 to a halt. The relay 369 also locks through its operated armature 1, lead 379, terminal 4 of the pole 101L, the normal armature of the interlock relay 112, lead 247 and pole 101B to the power lead 201. In this manner, if the switch 101 is set at position 4 for a rewind sequence, the rewind relay 369 locks-operated to halt the rewind sequence of the magnetic tape 68 in the magazine 35. In the event that the magnetic tape 68 is being rewound, for example, during a playback operation under control of the backspace relay 115 in a manner described above, the relay 369 does not become locked-operated because the pole 101L is not at position 4.

*Recording and Playback of the Same Magazine*

The normal playback sequence described above, was for playing back signals recorded in one of the magazines 35 through 39 at the same time that input signals were being recorded in a different one of the magazines 35 through 39. In the event it is desired to reproduce or play back signals recorded in a magazine which is being utilized for recording the input signals, the recording sequence is transferred to the standby magazine 39. To initiate the sequence, one of the playback buttons 11 through 15 is depressed to home the playback magazine selector switch 102 to the position indicated by the depressed magazine selector button. The playback mode switch 16 on the control panel 10 is also moved to position 2, the "play" position. The selector switch 102 homes to the position indicated by the depressed magazine selector button over an operating path described above through the poles 102A and 101D.

The lamps 41 through 45 on the control panel 10, as described above, provide a visual indication of the identity of the magazine which is recording the input signals. By depressing one of the playback buttons 11 through 15 which corresponds with the energized one of the lamps 41 through 45, a coincidence sequence is initiated for transferring the input signals to the standby magazine 39. A coincidence between the recording and playback magazines occurs when the magazine selector switches 103 and 102 are at the same position. The switch 103 selects the magazine for recording and the switch 102 selects the magazine for playback. If the switch 102 is positioned at the same position as the switch 103 by the playback buttons on the control panels, a coincidence sequence selector switch 104 is stepped to provide an indication of the coincidence between the magazine which is recording the input signals and the magazine from which the reproduction of signals is desired. Assume, for example, that the magazine 35 is still recording the input signals and that the playback button 11 on the control panel 10 is depressed to initiate a playback sequence of information, reproduced in the magazine 35. The coincidence sequence selector switch 104 is operated over a path from the power line 201, through the pole 103D at position 1, through the pole 102D also at the position 1, through the pole 101E at position 2, through lead 380, pole 104D at position 1, pole 104A also at position 1, through the interrupter 104D to the winding of the switch 104. The switch 104 accordingly steps from its normal position 1 to its position 2.

When the switch 104 steps to position 2, it homes the record coincidence magazine selector switch 106 to the position of coincidence to register an indication of the magazine identity. With the magazine 35 being the coincidence magazine, the switch 106 is homed to position 1. The operating path for the switch 106 is from the power line 201 through lead 381, pole 104C at position 2, lead 382, to the pole 102B at position 1, through the cable 384 to terminal 1 of the pole 106A. The pole 106A includes a multi-contact armature which contacts four of the five terminals at each position. In the position shown in FIGURE 7, an operating path is not completed from terminal 1 to the winding of the switch 106. The switch 106 accordingly remains at its position 1. If the switch 106 were in any other position at this time, it would home to its position 1 because it would continue to step as long as power was coupled through its terminal 1 at its armature to its winding. At any position of the switch 106 except the position 1, the armature of the pole 106A couples the operating potential to the winding of the switch 106.

When the coincidence switch 104 steps to its position 2, it also functions to record a 1 kilocycle tone in the first channel of the tape 68 in the magazine 35 which is still recording the input signals. The power line 201 is coupled through the lead 381, pole 104C at position 2, and pole 104E also at position 2, to the power lead 385 which is coupled to the oscillator 370. The oscillator 370 is a 1 kilocycle oscillator which is coupled to the input of the recording amplifier 71. As described above, the recording amplifier 71 is one of eight amplifiers 71 through 78 which respectively couple the input signals to the eight recording heads of one of the composite heads 210 through 214. The composite heads 210 through 214 are selected in accordance with the position of the selector switch 113, and, as indicated above, this switch is operated in parallel with the magazine selector switch 103. Accordingly, the selector switch 113 is at position 1 to utilize the composite head 210 which is coupled to the magnetic tape 68 of the magazine 35. The 1 kilocycle tone from the oscillator 370 is amplified by the recording amplifier 71 and the amplified tone is coupled through the pole 113A at position 1 to the recording head 1 of the composite head 210. The 1 kilocycle tone is accordingly recorded in the first channel of the magnetic tape 68 in the magazine 35.

At the same time that the coincidence switch 104 functions to record the 1 kilocycle control signal in the magazine 35, it initiates a homing operation of the magazine selector switch 103 to transfer the recording sequence to the magazine 39.

The operating path for the record magazine selector switch 103 is from the power line 201 through the lead 381, the pole 104C at position 2, armature 1 of the record reset relay 118 which is normal at this time, through lead 233 to terminals 2, 3 and 4 of the pole 103B of the selector switch 103. The armature of the pole 103B is a multiple contact armature which simultaneously contacts four of the five terminals 1 through 5 of the pole 103B at any position. With the magazine selector switch 103 initially at position 1, the armature of the pole 103B is positioned as shown in FIGURE 8. The potential from the power line 201 is, therefore, coupled through the pole 103B when the switch 103 is at position 1, through lead 388, pole 104B at position 2 and lead 228 to the winding of the selector switch 103. The switch 103 accordingly steps to position 2. At position 2, the pole 103B also coupled the stepping potential to the winding of the selector switch 103. The switch 103 accordingly steps repeatedly until position 5 is reached. At position 5, the homing sequence is halted.

The record head selector switch 113 is operated in parallel, as described above, with the magazine selector switch 103 so that the amplified input signals from the recording amplifiers 71 through 78 are now introduced to the composite recording head 214 instead of to the composite recording head 210. During the homing operation, the magazine 35 is de-energized because the operating paths to the take-up clutch 35F to the rewind clutch 35R and to the solenoid 35S are respectively interrupted at the poles 103H, 103J and 103K. These operating paths were described above during the continuous recording sequence. When the switch 103 is stepped to position 5, the poles 103H, 103J and 103K now couple operating potential received through leads 201 and 200 respectively to the clutches 39R and 39F and to the drive solenoid 395. The recording sequence is, in this manner, transferred from the magazine 35 to the magazine 39, after the 1 kilocycle control signal is recorded in the first channel of the magnetic tape 68 in the magazine 35.

With switch 103 in position 5, the coincidence switch 104 is stepped to its position 3. The operating path for the switch 104 is from the power line 201 through the pole 103E, now at position 5, lead 390 and the pole 104A at position 2 to the winding of the switch 104. The switch 104 accordingly steps from position 2 to position 3. With the switch 104 in position 3, and the input signals now being recorded in the standby magazine 39, the signals previously recorded in the magazine 35 can now be played back in accordance with the normal playback sequence described above. With the playback mode selector in position 2, the "play" position, the backspace relay 115 and the advance relay 114 are effective to move the magnetic tape 68 in the magazine 35 backward or forward to any particular position from which it is desired to play back the recorded signals. The input information continues to be recorded in the standby magazine 39 until the playback mode switch 101 is stepped to its position 1, the "off" position, or until the playback magazine selector switch 102 is stepped to a different position by one of the playback buttons 11 through 15 to terminate the coincidence described above between the recording and playback sequences.

When the playback mode switch 16 on the control panel 10 is moved to its "off" position, the selector switch 101 steps back to position 1 to complete a path from the power line 201, through the pole 101B, now at position 1, lead 392, and pole 104A at position 3 to the winding of the switch 104. The coincidence sequence selector switch 104 accordingly steps from position 3 to position 4. If one of the playback buttons 12 through 15 is operated so that anti-coincidence is indicated, an operating path is also completed for stepping the coincidence switch 104 from position 3 to position 4 from the power line 201 through the pole 102C at a position corresponding to the depressed buttons 12 through 15 on the control panel 10, cable 394, the pole 106B to the pole 104A at position 3. If there is a coincidence, power is not provided to step the switch 104 but if there is an anti-coincidence between the poles 102C and 106B, potential is coupled through the poles 102C and 106B to the pole 104A causing the switch 104 to step. In this manner, if either the playback mode switch 101 is returned to position 1 or if the magazine selector switch 102 is stepped to a different position (different from position 1) the switch 104 is operated to initiate a transfer sequence for returning the input signals to the magazine 35 instead of to the standby magazine 39.

The same operating path for stepping the coincidence selector switch 104 from its position 3 to its position 4 is extended through a lead 396 (FIGURE 8), through pole 104F, still at position 3, lead 398 and pole 105 at position 1 to the winding of the tape search selector switch 105. At the same time, therefore, that the coincidence selector switch 104 is stepped to position 4, the tape search selector switch 105 is stepped from its position 1 to its position 2. As is hereinafter described, the tape search selector switch 105 functions to locate the termination of the 50 cycle control signal continuously recorded in the first channel of the magazine 35 with the input signals so that the recording sequence can be continued at that point on the magnetic tape 68.

When the switch 105 steps to position 2, it connects a control amplifier 122 to the recording head 1 of the composite head 210 associated with the magazine 35 and it initiates a rewind sequence of the tape 68 in the magazine 35. The recording head 1 of the composite head 210 is utilized as a playback head to locate the 50 cycle tone continuously recorded on the magnetic tape 68 together with the input signals in the magazine 35. Actually because of the high speed reeling during rewind, the effective frequency of the 50 cycle tone is much higher than 50 cycles per second. The rewind speed may be 20 times as great as the recording speed of 1.7/3 inches per second so that an effective frequency of 1000 cycles per second is reproduced. The amplifier 122 is a tuned amplifier having a bandpass which includes 1000 cycles per second. During the search for the stepped 70 control tone, the recording sequence continues with the input signals being provided to the standby magazine 39. The recording head 1 of the composite head 210 is coupled through a cable 272, pole 106E at position 1 to indicate the original coincidence and pole 105E, now at position 2, to the control amplifier 122.

The tape search switch 105 also connects the output of the control amplifier 122 across the record search relay 120. The operating path for the relay 120 is through the pole 105B at position 2. The control amplifier 122 has two output terminals, one coupled directly to the winding of the relay 120 and the other coupled to the armature of the pole 105B. When the control amplifier 122 detects the continuously recorded control signal, it accordingly operates the record search relay 120 to provide an indication of the control signal detection.

As indicated above, the tape 68 in the magazine 35, which was the magazine originally utilized for recording the input signal, is rewound when the search selector switch 105 steps to position 2. During the search interval, the path for supplying power to the rewound clutches 35R is from the power line 201 through the pole 105H at position 2, the pole 106H, still at position 1, and the normal armature 2 of the relay 369 to the rewind clutch 35R. The control amplifier 122 searches for the control tone during the rewind sequence of the magazine 35. The rewind sequence continues until the tone is detected and the record search relay 120 is operated. At the same time that the relay 120 operates, the tape search selector switch 105 is stepped from its position 2 to its position 3. The operating path for the switch 105 is from the output terminal 122A of the amplifier 122, pole 105B at position 2, pole 105A at position 2 to the winding of the switch 105. The switch 105, in this manner, steps to its position 3 at the same time that the relay 120 operates to indicate the detection of the control tone in the magazine 35. By the time the switch 105 steps, the position on the magnetic tape upon which the control tone ends or terminates has been rewound on the payout reel of the magazine 35. When the switch 105, however, steps from position 2 to position 3, it removes power from the rewind clutch 35R and it provides power to the take-up clutch 35F so that the magazine 35 goes into a fast-forward operation to locate the end of the control tone. At the end of the control tone, the control amplifier 122 releases the relay 120. When the relay 120 returns to its normal condition, it steps the switch 105 from position 3 to position 4 to halt a tape at the end of the recorded tone. The switch 105 is stepped to position 4 when the relay 120 releases over a path from lead 201 (FIGURE 10), the normal armature of the take-up relay 125, lead 399, the normal armature 1 of relay 120 and pole 105A at position 3 to the winding of switch 105. When the pole 105J of the switch is stepped to position 4, it opens the path for supplying power to the take-up clutch 35F so that the tape 68 in the magazine 35 is halted.

When the switch 105 steps to position 4, it also functions to record the 1 kilocycle tone on channel 1 of the magazine 39. The power is provided from the power line 201 through the pole 104C at position 4, pole 106C at position 1 to indicate the original coincidence, pole 103C at position 5, pole 105C, now at position 4, pole 104E at position 4 and the oscillator 370 to the recording amplifier 71. The recording amplifier 71 is coupled through pole 113A at position 5 to the recording head 1 of a composite head 214. The composite head 214 is magnetically coupled to the tape 68 in the standby magazine 39.

At the same time that the 1 kilocycle control signal is recorded in the magazine 39, a homing operation is initiated for returning the selector switch 103 and the selector switch 113 back to position 1 for recording the input signals in the original magazine 35. The homing path for the switches 103 and 112 is from the power line 201 through the lead 381, pole 104C at position 4, pole 106C at position 1, pole 103C at position 5, lead 401, pole 105C at position 4 and lead 228 to the windings of the switches 103 and 113. When the switches 103 and 113 step from position 5 to position 1, the recording sequence of the input signals is transferred from the magazine 39 back to the magazine 35. The clutches 39R and 39F and the solenoid 39S are de-energized and the clutches 35R and 35F and the solenoid 35S are energized over paths through the poles 103H, 103J and 103K. These operating paths were described above during the continuous recording sequence.

When the switch 103 returns to its original position, the position 1, to select again the magazine 35, its position coincidence with that of the switch 106 causes the search switch 105 to step from position 4 back to position 1 to ready it for the next cycle of operation. The operating path for the switch 105 is from the power line 201 through the pole 103D at position 1, the pole 106D at position 1 and the pole 105A at position 4 to the winding of the switch 105. With the switch 105 back in position 1, the control mechanism 18 is back in its original recording condition and the recording sequence continues in the normal manner. For example, when the end of the magnetic tape 68 in the magazine 35 is detected, the recording signals are automatically transferred to the magazine 36.

During the searching operation for the continuously recorded 50 cycle control signal, in order to return the recording sequence back to the original magazine, if the terminating end of the tape 68 in the magazine 35 is reached, the interlock relay 125 is operated to couple operating potential through a lead 403 to the pole 105A which is at position 3 during the fast-forward operation. The switch 105A accordingly steps to position 4 to initiate the return transfer sequence from the magazine 39 to the magazine 35. When the switch 103 homes to position 1, it steps to position 2 under control of the tape end switch 220 just as in the continuous recording sequence. The switch 220 completes a path over cables 225 and 226 to step the switch 103. The recording sequence, therefore, recommences at magazine 36.

The 1 kilocycle tones recorded on the tape 68 before a transfer of the input signals to another tape are utilized during the automatic playback sequence. As is hereinafter described, the 1 kilocycle tones function to switch the playback sequence back and forth to the standby magazine 39 so that the reproduced signals are continuous and in the order introduced to the recording apparatus. The 1 kilocycle tones are not effective during the searching operation for the end of recorded signals on the original tape as it is the 50 cycle continuous tone stepped up to 1 kilocycle by the high speed reeling which is effective.

During the continuous recording sequence described above, the signals to be recorded were successively introduced to all five magazines 35 through 39. If the standby magazine 39 is not required for any coincident playback sequence of the type just described, ten hours of input signals may be recorded with two hours in each of the five magazines 35 through 39. If a portion of the tape 68 in the magazine 39 is utilized for coincident playback sequences, the total continuous recording sequence has a duration less than ten hours but at least of eight hours. Suppose, for example, that approximately ½ of the tape 68 in the magazine 39 has been utilized for recording input signals. During the continuous recording sequence when the end of the tape 68 in the magazine 38 is reached, the selector switch 103 is stepped to position 5 to select the magazine 39. The tape 68 in the magazine 39, however, is not positioned at its beginning adjacent the recording head 214 but is positioned at a point at which it was stopped at the end of the last coincident playback sequence. The tape 68 in the magazine 39 is not rewound during the coincident playback sequences. The maximum duration, therefore, of the continuous recording sequence depends upon the number and durations of coincident playback sequences.

*Automatic Playback*

At the completion of the continuous recording sequence, it may be desired to play the entire recorded information in sequence without intersplicing the tape in the magazine 39. The 1 kilocycle tone, which was recorded at two switching points for each coincident playback sequence, is utilized to control the automatic playback sequence in the same order as during the recording sequence. To initiate the automatic playback sequence, the mode switch 16 on the control panel 10 is first moved to position 2, the play position, and the magazine selector button 11 is depressed. Any one of the magazines may be utilized for the starting point but usually the first magazine 35 is utilized for initiating the automatic playback sequence.

When the switch 16 on the control panel 10 is turned to the automatic play position, the mode selector switch 101 is homed to position 5. When the switch 102 is stepped to position 1 under control of the button 11, an automatic playback memory switch 107 is also stepped to position 1. The operating path for the switch 107 is from the power line 201 through the normal armature 2 of an automatic transfer relay 108, the pole 102E at position 1, the armatures of an automatic playback selector relay 109, the pole 107B, and the normal armature 3 of the relay 108 to the winding of the switch 107. The switch 107 steps when its winding is de-energized which occurs when the position of the poles 107B and 102E in the operating path match.

When the switch 101 is moved to position 5, it closes a control path from the line 201 through the pole 101B for operating the transfer relay 108 to disconnect the magazine selection buttons 11 through 15 and to switch the homing circuit to the winding of the switch 102. The control path is through the poles 101D, 101B, 102E and the armatures of the transfer relay 108. The winding of switch 103, the magazine selector switch, is connected through pole 104B at position 1, pole 103A at position 1, pole 107A at position 1 and the operated armature 3 of relay 108 to the winding of relay 107. When the switch 107 is thereafter stepped, the switch 103 steps therewith. Playback continues in the normal manner in the magazine 35 until a 1 kilocycle tone appears and is detected through the pole 105E by the control amplifier 122. The control amplifier 122 recognized the 1 kilocycle tone as well as the higher frequency tone developed during rewind and fast-forward. The control amplifier 122 operates a playback sequence relay 110 over a path through the pole 105B.

When the playback sequence relay 110 operates momentarily by the amplifier 122, it homes the switch 102 to the magazine 39 through the armatures of the switch 108 instead of to the magazine 35. When relay 110 operates, it completes a path from the power line 201 through the operated armature of relay 110 to the winding of relay 109. The relay 109 is a bistable relay which remains operated until the next momentary operation of the relay 110. When the relay 109 operates, it connects power from line 201 through the operated armature 2 of relay 108, the operated armatures 1-4 of relay 109, the contacts 1-4 of pole 102E, the operated armature 1 of relay 108 and pole 101D at position 5 to the winding of the switch 102. The switch 102 accordingly homes or steps to position 5.

With the switch 102 at position 5, the magazine 39 is energized and the magazine 35 de-energized.

The information is now reproduced from the magazine 39 until the next 1 kilocycle tone is detected therefrom. The 1 kilocycle tone from the magazine 39 operates the bistable relay 109 back to its original normal position to home the switch 102 back to the original magazine. When the switch 109 is reset upon the momentary operation of relay 110 by the amplifier 122, it establishes a homing path through the pole 107B to return the playback sequence back to its original playback magazine 35. The path is from line 201 through the operated armature 2 of relay 108, pole 107B, the now normal armatures of relay 109, pole 102E, the operated armature 1 of relay 108, pole 101D at position 5 to the winding of the switch 102. This procedure continues until the end of the magazine 35. At this point, the end of the tape switch 220 steps the switch 107 to position 2 which causes the switch 102 to home to the next magazine 36. The reproducing sequence continues with successively detected tones controlling a switching operation between the magazines 36 through 38 and the standby magazine 39.

Each time a tone is detected in one of the magazines 35 through 38, the playback sequence is transferred to the magazine 39 until a tone therefrom is detected. When a tone in the magazine 39 is detected, the playback sequence is returned to the original magazine from which the original transfer took place. The pole 107B functions as a memory to register the identity of the original magazine from which the original transfer took place.

If no playback of the coincidence occurred during the recording sequence, no control tones were recorded and switching of magazines is not utilized. The automatic playback sequence for such a condition merely continues successively from one magazine to the other under control of a stepping switch 107 as it is stepped by the tape end switches 220—223.

At the end of the playback sequence of magazine 39, the switch 224 turns off the apparatus in a manner described during the continuous recording sequence.

During the continuous recording or automatic playback sequences erasure of any of the signals is generally not utilized. As described above, any of the recorded signals may be erased by closing a switch 806 (FIGURE 6) and setting a stepping switch 805 connected thereto. The switch 805 may be similar to the switch 113 or 116 and is utilized to couple the supersonic bias signal from the oscillator 62 to any one of the composite erase heads 700 through 704 (FIGURES 6 and 4). The heads 700 through 704 may be similar to the head 210 through 214 described above and are also positioned adjacent the tapes 68 in the magazines 35 through 39 respectively.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A recording and reproducing apparatus, including, a plurality of individually movable recording mediums, a plurality of transducer members individually positioned adjacent said plurality of recording mediums for introducing signals to be recorded to said plurality of recording mediums, first means for successively moving said recording mediums and for introducing the signals to be recorded to said transducing member which is positioned adjacent the moving one of said mediums, second means for reproducing signals recorded on any one of said plurality of recording mediums without disturbing the operation of said first means, and means for reproducing signals recorded on said recording medium being moved by said first means including means responsive to a coincidence between the identities of the recording medium being moved and the recording medium from which signals are to be reproduced for switching the signals to be recorded to a predetermined one of said recording mediums different from said recording mediums being moved instead of to the recording medium being moved.

2. A multiple tape recording apparatus, including, a plurality of tape magazines each having a first and a second reel for each of a number of magnetic tapes for supporting the magnetic tape therebetween, and a movable pinch roller; and a control mechanism for said plurality of magazines including means coupled to all of said first and said second reels for selectively driving them to move any one of the magnetic tapes, playback control means for initiating the movement of any one of said recording mediums and for reproducing signals recorded on the recording medium moved thereby, and means responsive to a coincidence of said recording medium the movement of which is initiated by said playback control means and said recording medium being moved by said first medium for halting the movement of the coincident recording medium by said first means and for transferring the signals to be recorded to another one of said recording mediums.

3. A multitape recorder and reproducer including a number of magnetic tapes one of which is utilized as a standby, transducer means for each of the tapes for recording signals on the tape and for reproducing signals previously recorded on the tape, means for successively moving said tapes and for introducing signals to be recorded to said transducer means associated with a moving tape, means for selecting any one of said tapes for reproducing signals previously recorded without interrupting the continuous recording of signals by said moving and introducing means, and means coupled to said selecting means and responsive to a coincidence of a tape selection by said selecting means and the movement of a tape by said moving and introducing means for transferring the signals to be recorded to said transducing means associated with said standby tape.

4. A multitape recorder and reproducer in accordance with claim 3 including in addition means responsive to the tape recording and reproducing coincidence for moving said standby tape and for halting the movement of the tape being moved by said moving and introducing means.

5. A multitape recorder and reproducer in accordance with claim 4 including in addition means effective at the end of a reproducing sequence for transferring the signals to be recorded back to the coincidence tape and for halting the movement of said standby tape.

6. A multitape recorder and reproducer in accordance with claim 5 including in addition means responsive to the tape recording and reproducing coincidence for recording a control tone on the coincidence tape, and means effective at the end of the reproducing sequence for recording a control tone on the standby tape.

7. A multitape recorder and reproducer including a number of magnetic tapes one of which is utilized as a standby, transducer means for each of the tapes for recording signals on the tape and for reproducing signals previously recorded on the tape, means for successively moving said tapes and for introducing signals to be recorded to said transducer means associated with a moving tape, means for selecting any one of said tapes for reproducing signals previously recorded without interrupting the continuous recording of signals by said moving and introducing means, means coupled to said selecting means and responsive to a coincidence of a tape selection by said selecting means and the movement of a tape by said moving and introducing means for transferring the signals to be recorded to said transducing means associated with said standby tape, means controlled by said selecting means and effective after the operation of said transferring means for reproducing the previously recorded signals, means for halting reproducing of the previously recorded signals, and means responsive to said halting means transferring the signals to be recorded back to said transducing means associated with the tape selected by said selecting means.

8. A multitape recorder and reproducer in accordance with claim 7 including in addition automatic playback means for reproducing the signals recorded on said tapes in the same order in which they were recorded.

9. A multitape recorder and reproducer in accordance with claim 7 wherein said means for transferring the signals to be recorded back to said transducing means includes means for locating the end of the signals previously recorded on said tape selected by said selecting means, and means effective after the end of the signal is located for introducing the signals to be recorded to said transducing means associated with said selected tape for recording thereon after the located signal end.

10. A multitape recorder and reproducer in accordance with claim 7 including in addition means for recording a control tone at the end of the recorded signals before a transfer operation by either of said transferring means, and automatic playback means controlled by said control tones for reproducing the signals recorded on said tapes in the same order in which they were recorded.

References Cited in the file of this patent

UNITED STATES PATENTS

| | | |
|---|---|---|
| 2,507,385 | Schrader | May 9, 1950 |
| 2,778,637 | Eash | Jan. 22, 1957 |
| 2,804,508 | Mastling et al. | Aug. 27, 1957 |
| 2,821,576 | Gaubert | Jan. 28, 1958 |

FOREIGN PATENTS

| | | |
|---|---|---|
| 685,032 | Great Britain | Dec. 31, 1952 |